United States Patent
Behera et al.

(10) Patent No.: US 11,720,541 B2
(45) Date of Patent: Aug. 8, 2023

(54) DOCUMENT CONTENT EXTRACTION AND REGRESSION TESTING

(71) Applicant: Morgan Stanley Services Group Inc., New York, NY (US)

(72) Inventors: Anshuman Behera, Harrison, NJ (US); Raka Rajanigandha, Jersey City, NJ (US)

(73) Assignee: Morgan Stanley Services Group Inc.

(*) Notice: Subject to any disclaimer, the term of this patent is extended or adjusted under 35 U.S.C. 154(b) by 293 days.

(21) Appl. No.: 17/142,229

(22) Filed: Jan. 5, 2021

(65) Prior Publication Data
US 2022/0215012 A1 Jul. 7, 2022

(51) Int. Cl.
G06F 16/00 (2019.01)
G06F 16/23 (2019.01)
G06F 16/958 (2019.01)

(52) U.S. Cl.
CPC ........ G06F 16/2365 (2019.01); G06F 16/986 (2019.01)

(58) Field of Classification Search
CPC ........................... G06F 16/2365; G06F 16/986
See application file for complete search history.

(56) References Cited

U.S. PATENT DOCUMENTS

| | | | |
|---|---|---|---|
| 6,147,767 A * | 11/2000 | Petteruti | G06K 15/00 |
| | | | 358/1.18 |
| 7,013,309 B2 | 3/2006 | Chakraborty et al. | |
| 2003/0106017 A1 * | 6/2003 | Kanchirayappa | G06F 16/258 |
| | | | 715/229 |
| 2007/0236717 A1 | 10/2007 | Nishikawa | |
| 2008/0281944 A1 * | 11/2008 | Vorne | H04L 67/12 |
| | | | 709/218 |
| 2009/0030671 A1 | 1/2009 | Kwon et al. | |
| 2009/0055341 A1 * | 2/2009 | Bidkar | G06Q 30/02 |
| | | | 707/E17.014 |
| 2012/0102388 A1 | 4/2012 | Fan | |

(Continued)

OTHER PUBLICATIONS

Jimenez, Ivo, et al. "The popper convention: Making reproducible systems evaluation practical." 2017 IEEE international parallel and distributed processing symposium workshops (ipdpsw). IEEE, 2017.*

(Continued)

*Primary Examiner* — Nan Hutton
(74) *Attorney, Agent, or Firm* — Weitzman Law Offices, LLC

(57) ABSTRACT

A system for confirming file integrity of automatically generated documents is disclosed. The system comprises one or more processors that execute instructions to receive a document template specifying one or more sections, each section comprising a set of labels for attributes and receive two or more automatically generated documents, each comprising the set of labels for attributes and values of each of those attributes. The system extracts the set of labels for attributes and values of each of those attributes from each of the two or more automatically generated documents. Finally, the system generates a tabular report comparing the values of each of the attributes and generates an alert for a human user if the value for any attribute in a first document is different from the value for that attribute in a second document.

18 Claims, 7 Drawing Sheets

(56) References Cited

U.S. PATENT DOCUMENTS

| | | | |
|---|---|---|---|
| 2012/0131040 A1* | 5/2012 | Wong | G06F 16/215 |
| | | | 707/769 |
| 2013/0290270 A1 | 10/2013 | Pareek | |
| 2013/0318110 A1 | 11/2013 | Develyn | |
| 2014/0108897 A1 | 4/2014 | Boutelle et al. | |
| 2015/0248382 A1 | 9/2015 | Shin et al. | |
| 2017/0270036 A1* | 9/2017 | Alex | G06F 11/3688 |
| 2017/0277663 A1 | 9/2017 | Reimherr et al. | |
| 2018/0157723 A1 | 6/2018 | Chougule et al. | |
| 2018/0341830 A1 | 11/2018 | Jagan et al. | |
| 2019/0129931 A1* | 5/2019 | Hegde | G06F 40/186 |
| 2019/0294399 A1 | 9/2019 | Yu et al. | |
| 2019/0294663 A1 | 9/2019 | Yu et al. | |
| 2020/0026749 A1 | 1/2020 | Karlapudi | |
| 2020/0073878 A1 | 3/2020 | Mukhopadhyay et al. | |
| 2020/0175268 A1 | 6/2020 | Lewis et al. | |

OTHER PUBLICATIONS

De Santiago Júnior, Valdivino Alexandre, et al. "EXTFV: Automated Test Case Execution and Automated Generation of Artifacts related to the Verification and Validation Process.".*

* cited by examiner

DOCUMENT CONTENT EXTRACTION AND REGRESSION TESTING

FIELD OF INVENTION

This application relates to systems for and methods of automated analysis of machine-generated documents based on templates, and more specifically, to systems that receive a file in a first format, extract data into a second format to facilitate analysis, and help human users to compare the extracted data to expected data in order to identify corruption or error in the machine generation process.

BACKGROUND

Some organizations are obligated to generate reports or other documents on a regular basis for a particular reader or audience. For example, a government agency may regularly generate reports regarding statistics gathered by the agency for public use, or a bank may generate monthly statements with account balances, transactions, and other information of interest to an account holder.

When such a document is to be repeatedly re-created with differing values, it is preferable to create a single template into which data values will automatically be populated each time a new instance of the document is necessary. Using a functionality such as the "mail merge" offered in many word processors, many word processing documents or other documents are created as instances of the template, each populated with separate data. Each word processing document or other document can then be published; printed and physically mailed; or e-mailed to or otherwise transmitted to a particular recipient or set of recipients.

Whenever a template is changed to rearrange the data presented or to change what data is present, there may be a user error in defining the template, or a user or machine error during the process of parsing the template, obtaining data, populating the template, and generating the resulting document. At regular intervals, and especially after a change to the template, organizations will want to perform regression testing to ensure that the most recent instances of generated documents have accurate information in every data field represented. This process is time-consuming and can require dozens of hours of human analysis before reviewing enough documents to achieve confidence that the new generation process is accurate.

Thus, there are advantages to a system that can receive documents in bulk and perform automated regression testing on them, freeing up human labor and speeding the process of regression testing the documents.

SUMMARY OF THE INVENTION

A system for confirming file integrity of automatically generated documents is disclosed. The system comprises one or more databases for document storage, one or more processors, and non-transitory memory storing instructions. When the one or more processors execute the instructions, the one or more processors receive a document template specifying one or more sections, each section comprising a set of labels for attributes and receive two or more automatically generated documents, each comprising the set of labels for attributes and values of each of those attributes. The processors) then extract the set of labels for attributes and values of each of those attributes from each of the two or more automatically generated documents. Finally, the processor(s) generate a tabular report comparing the values of each attribute in the two or more automatically generated documents and generate an alert for a human user if the value for any attribute in a first document of the two or more automatically generated documents is different from the value for that attribute in a second document of the two or more automatically generated documents.

Similarly, a computer-implemented method for confirming file integrity of automatically generated documents is disclosed. The method comprises, among other features, receiving a document template specifying one or more sections, each section comprising a set of labels for attributes; receiving two or more automatically generated documents, each comprising the set of labels for attributes and values of each of those attributes; extracting the set of labels for attributes and values of each of those attributes from each of the two or more automatically generated documents; generating a tabular report comparing the values of each attribute in the two or more automatically generated documents; and generating an alert for a human user if the value for any attribute in a first document of the two or more automatically generated documents is different from the value for that attribute in a second document of the two or more automatically generated documents.

BRIEF DESCRIPTION OF THE DRAWINGS

Other aspects, features and advantages will become more fully apparent from the following detailed description, the appended claims, and the accompanying drawings, provided solely for purposes of illustration without restricting the scope of any embodiment:

DETAILED DESCRIPTION

In order to address the issues described above, a system is provided to enable bulk automated analysis of documents for regression testing, verifying that data has been accurately propagated from databases to the final product and is properly labeled.

In contrast to previous systems of human quality assurance that would invest the dozens of man-hours to visually review generated documents and compare the generated values with expected values, the presently described system allows a user navigating a user interface to select sets of documents for regression testing with a single click and receive succinct or detailed reports indicating that a new document is accurate, or indicating the nature of the error if it is not. Thousands of pairs of documents may be processed every hour, with human involvement only when errors in the output reports indicate that a particular document may not be being generated accurately according to the template. The presently described system also operates by analyzing the contents of a document at the file level, rather than scanning a document at the pixel level after it has been rendered for visual display. As a result, comparison and analysis is not hampered if the data is presented in a typeface that is difficult to discern via optical character recognition, or when pagination results in data being moved to a different page in one form of a document compared to another.

Figure 1:
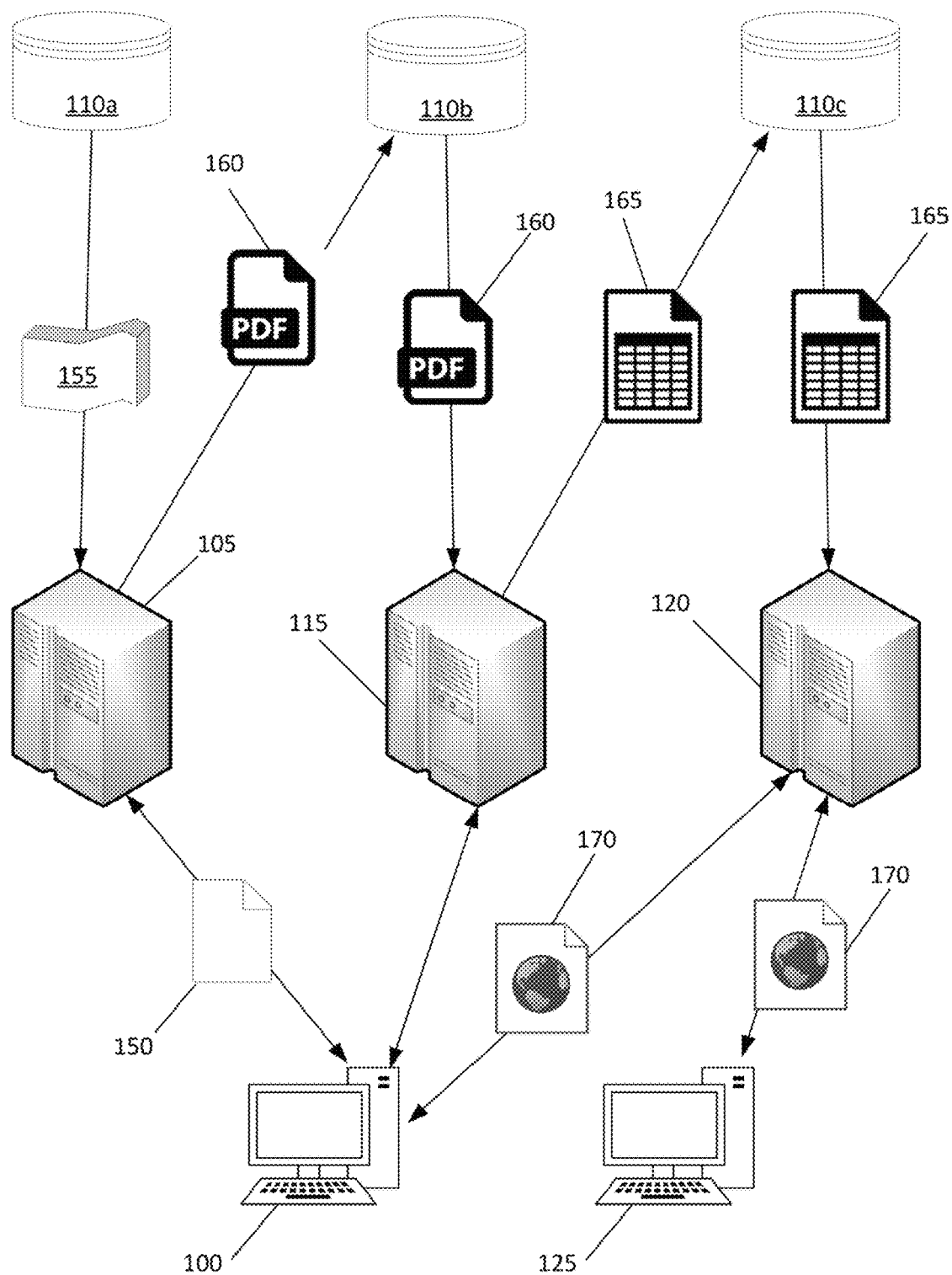
FIG. 1 depicts a network of computing devices to be used in a system for confirming file integrity of automatically generated documents.

FIG. 1 depicts a network of computing devices to be used in a system for confirming file integrity of automatically generated documents.

A user's computing device 100 is initially used to provide an updated data presentation template 150 to a document management server 105. The document management server 105 may provide a specialized application programming interface (API) so that software running on the user's computing device 100 can easily upload documents to the document management server 105, or may more passively receive documents, for example by running a file transfer protocol (FTP) service that can receive documents from anyone having proper permissions.

The document management server 105 pulls data 155 from one or more databases 110a that store data necessary to populate the data presentation template, and then automatically generates one or more output documents 160 according to the template 150 and using the data 155. In a preferred embodiment, these documents 160 are of the Portable Document Format (PDF), but may have other formats in potential other variations. These documents 160 can also be stored in one or more databases 110b and/or downloaded to the user's computing device 100.

Figure 5:
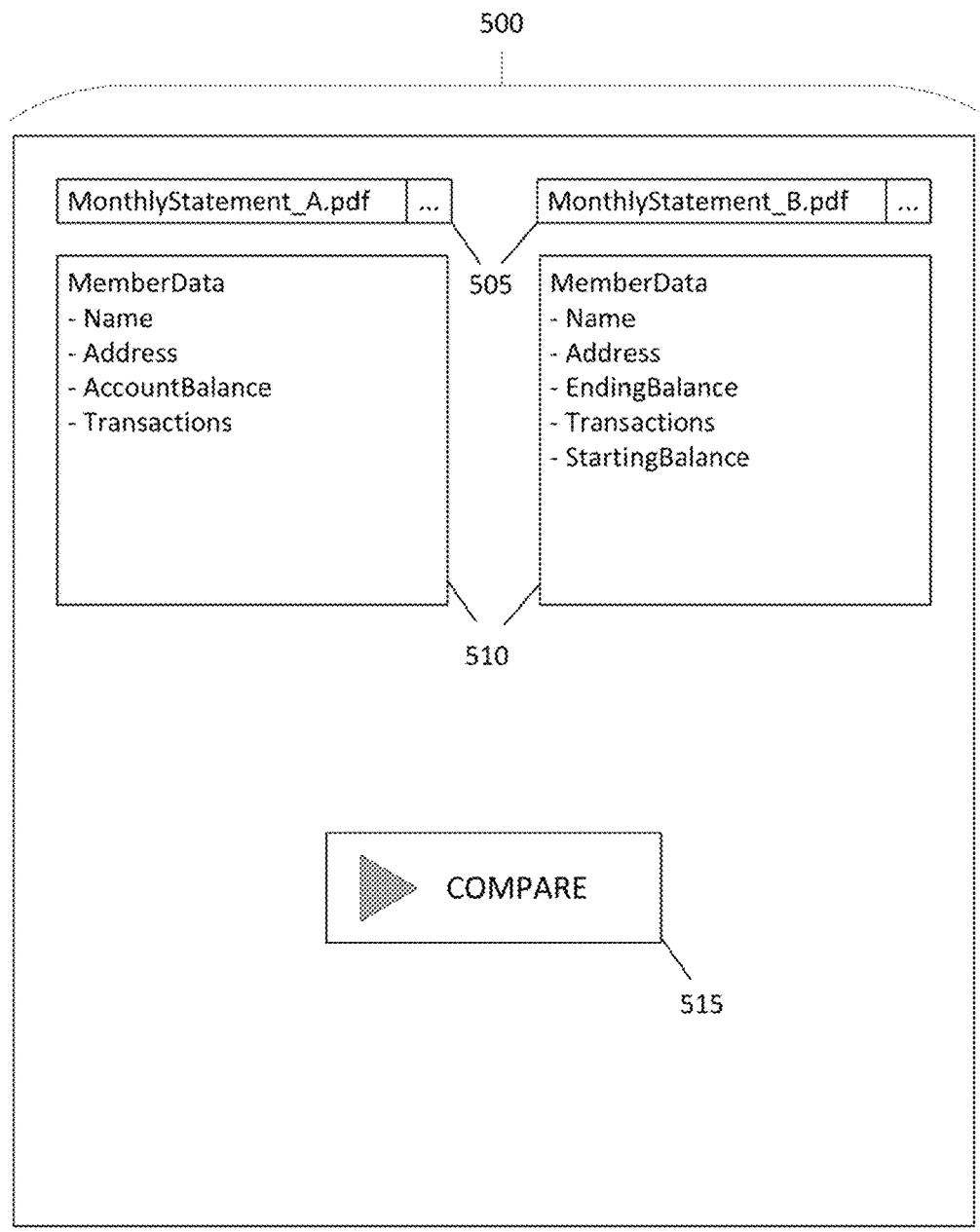
FIG. 5 depicts a sample user interface for batch comparison of documents.

At a time after the output documents 160 have been generated, the user's computing device 100 may be used to issue a command to an extractor server 115 to obtain two such output documents 160 and perform regression testing by extracting their contents and generating easy-to-use reports 165 for human quality testers, according to a method described further below in relations to FIG. 3. The reports 165 including the extracted data may be provided directly for download by the user's computing device 100, and/or may be transmitted to one or more databases 110c for long-term storage. The extractor server 115 may provide an API to be called by software on the user's computing device 100 (including by a browser, as depicted in FIG. 5), or may, in some embodiments, be a UNIX server having a software module that can be executed by any person who has permissions to log into the server and execute software thereon.

Figure 6:
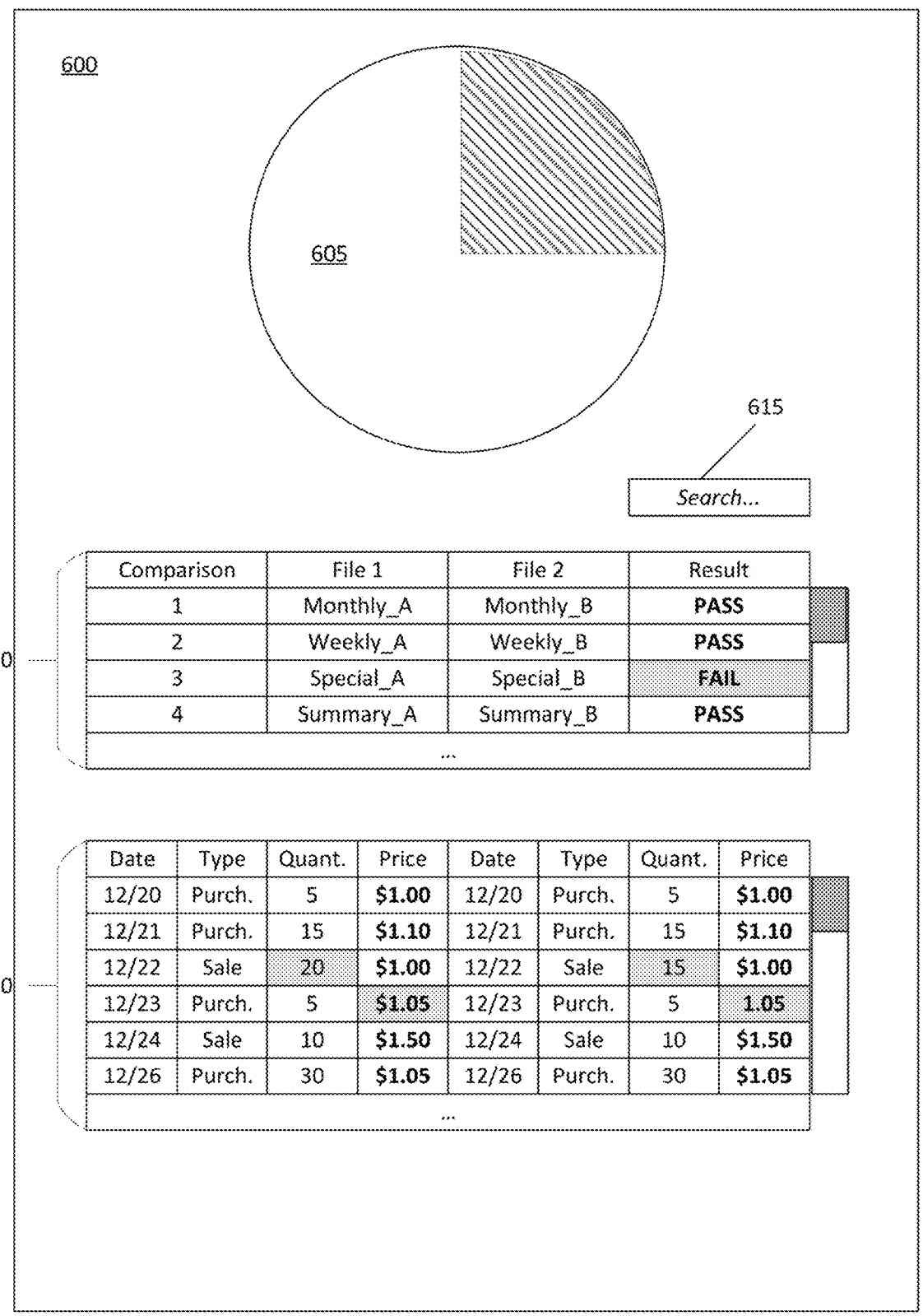
FIG. 6 depicts an interactive report generated after a batch comparison of documents.

Finally, a web server 120 generates a web-based user interface 170 to allow interactive review of data comparisons 165, as depicted in FIG. 6. Although the document generation and extraction processes on servers 105 and 115 may require particular elevated permissions to trigger, the web server 120 may be set up such that other users with less elevated permissions (such as a user of an additional computing device 125, who may be a quality assurance tester instead of a developer or designer) can navigate to a particular URL provided by the web server and see the same information as a user of the first computing device 100, despite not having provided the template for generating the documents nor having triggered the extraction.

The user's computing device 100 or another user's computing device 125, in addition to being able to connect to the web server 120 and display the web-based user interface 170 generated by the web server 120, or use a native client to display information obtained via communication with web server 120.

Although a particular division of functions between devices is described in the system above, other configurations are possible in which functions are divided among devices differently. For example, all of the functions of the databases 110a-110c, the document management server 105, the extractor server 115, and the web server 120 may be performed by a single device with multiple threads executing different software modules simultaneously. Similarly, devices might be grouped by functionality, such that databases 110a-110c are all databases stored by a single database server which is inaccessible to uses, and the document management server 105, the extractor server 115, and the web server 120 are all modules in a single server that is accessible to users and acts as the interface for obtaining, inserting, or manipulating data from the database. Alternatively, each system may in fact be a cluster of computing devices sharing functionality for concurrent processing. The specific number of computing devices and whether communication between them is network transmission between separate computing devices or accessing a local memory of a single computing device is not so important as the functionality that each part has in the overall scheme.

Further, although various computing devices 105, 110a-110c, 115, and 120 are described as if they are one computing device or cluster each, a cloud-based solution with multiple access points to similar systems that synchronize their data and are all available as backups to one another is preferable to a unique set of computing devices all stored at one location.

Figure 2A:
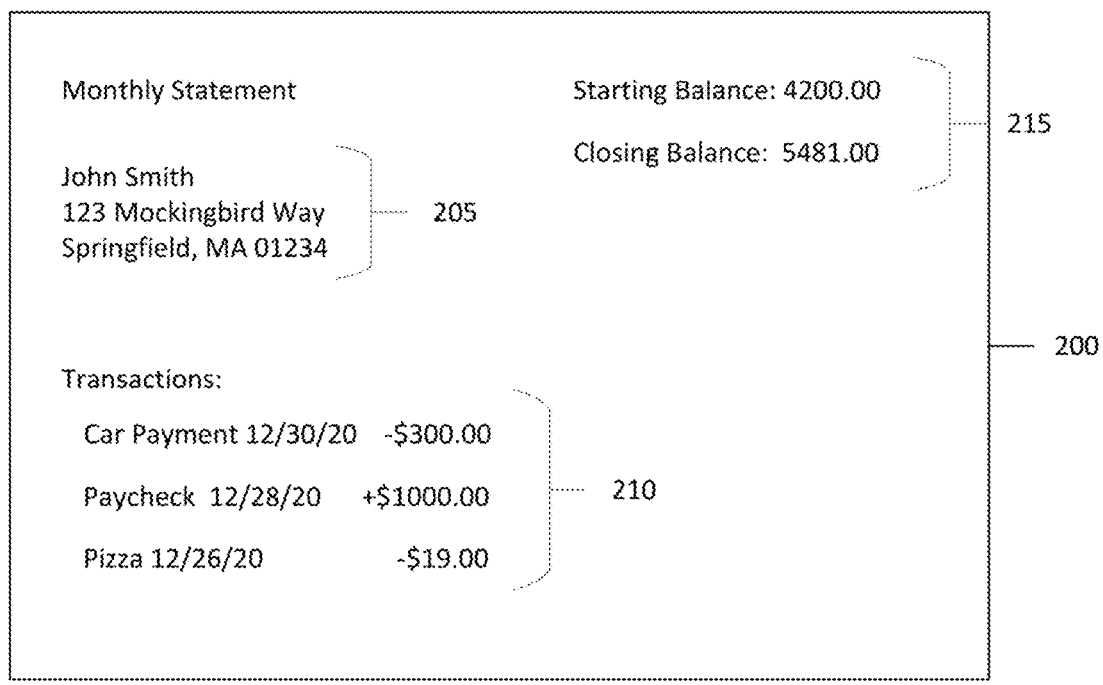
FIGS. 2A and 2B depict a potential comparison between two different documents, each generated according to a different presentation template but a same data template.
Figure 2B:
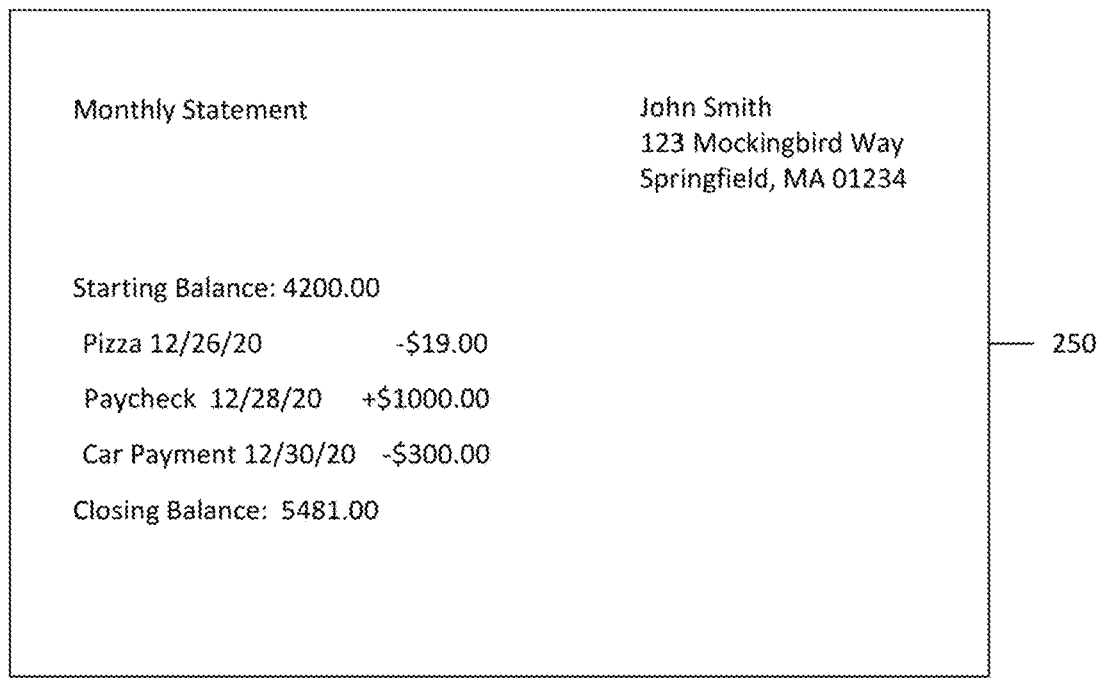

FIGS. 2A and 2B depict a potential comparison between two different documents, each generated according to a different presentation template but a same data template.

In FIG. 2A, a first document 200 includes several sections that are automatically populated based on stored data, including account holder details 205, transaction list 210, and summary details 215. In FIG. 2B, a second document 250 has been generated according to the same data template (i.e., it intends to pull the same data values to populate the document), but uses a different template for arranging the presentation of the data. For example, each of the data sections has been moved, the summary data is consolidated into the transaction data, and the ordering of the transaction data has been changed from reverse chronological order into standard chronological order. These various changes introduce the possibility of error—for example, that integrating the summary data with the transaction data might cause the summary data to overwrite one of the rows of the transaction data—and require regression testing to ensure that the presentation template has been properly prepared.

Figure 3:
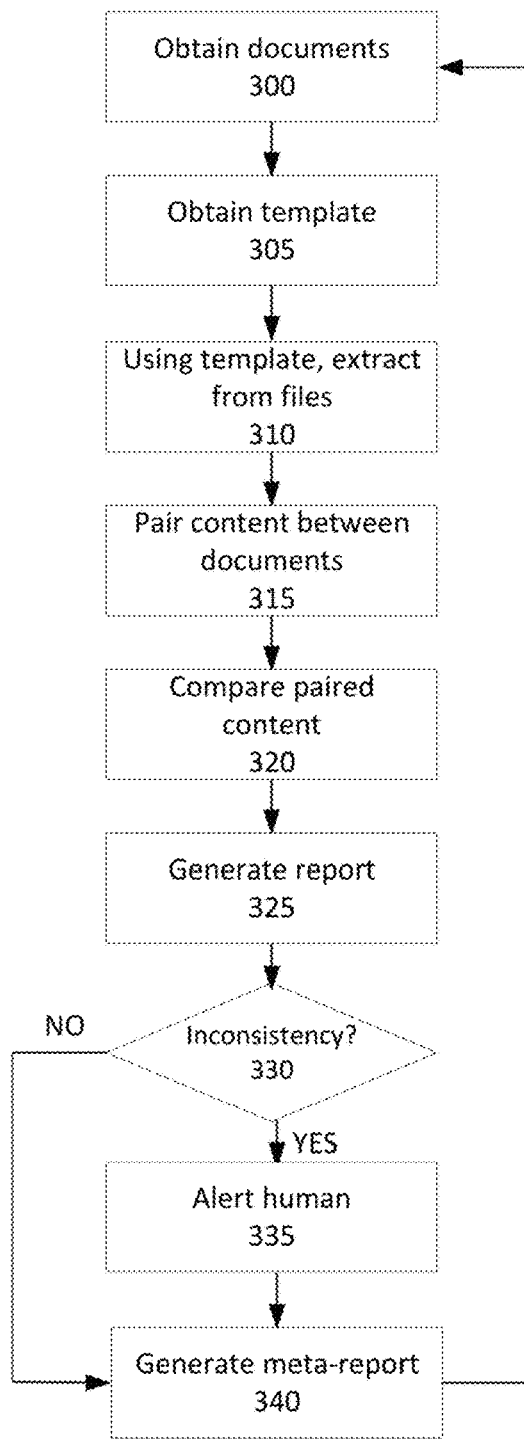
FIG. 3 depicts, in simplified form, a method of automatically performing regression tests on automatically generated documents.

FIG. 3 depicts such a method of automatically performing regression tests on automatically generated documents.

Initially, two or more automatically generated documents are retrieved from storage by the extractor system for comparison purposes (Step 300). As mentioned above, in a preferred embodiment, the documents are each of the PDF filetype, though the methods described herein could be adapted to other file formats, such as an office open extensible markup language (OOXML) formatted text document (including a .DOC, .DOCX or .ODF).

In a preferred embodiment, the two or more documents are identified by a shared file naming convention. For example, if two files share a same prefix and a differing suffix, such as "Filename_A.pdf" and "Filename_B.pdf", the system may be configured to treat them as different versions using a same data template. In other embodiments, a human user may have identified the documents via a user interface, such as by selecting them from a file selection window, dragging and dropping them into a user interface element, uploading them on a webpage, or otherwise supplying them to or selecting them from the interface (as depicted by way of example in FIG. 5).

At approximately the same time, the extractor also retrieves from storage a template to which each of the two or more documents are meant to correspond (Step 305). Although depicted in the flowchart of FIG. 3 as a subsequent step, retrieval of the template can occur simultaneously with, before, or after retrieval of the documents, or the template may be persistently stored in memory and ready to be used whenever the extractor is executed.

In an example embodiment, the template is stored as an OOXML spreadsheet (.XLS or .XLSX) file, though in other embodiments, different file structures, such as plain text or comma-separated values (.CSV) might be used. Each template defines one or more sections, each section storing some columns of data (i.e., a single label for an attribute associated with a single value for that attribute, such as the name and address 205) and/or some tables of data (i.e., a structure of multiple rows and columns for more complex data, such as the transaction list 210). Each section also specifies header or start values/delimiters and footer or end values/delimiters to be used in identifying where one second ends and another begins while traversing the contents of the PDF document. Some sections may be repeated, and if so, the template will specify this property with a Boolean flag so that the extraction process will check for start delimiters of a new section even if that section type has been seen before. For example, if the document in FIG. 2B were modified to include multiple months' transactions, the template might specify that there is a first section that does not repeat and that begins with a "Name" label and ends with an "Address" label, as well as a second section that does repeat and that begins with a "Starting balance" label and ends with an "Closing balance" label. Some sections may be defined in such a way that they have multiple possible start delimiters or end delimiters, based on optional data that may be present in the generated document only if it is available or only under conditional circumstances. For example, a document might be configured to end a section with a "Closing balance" in dollars if the recipient has an American address, but to add a "Exchange rate value" to a local currency if the recipient does not have an American address, in which case a parser may not trigger the end of the section until it is certain that no more end delimiters are found before a start delimiter for a next section. A template may also specify that some sections in a given document are actually unique or irrelevant, and should not be extracted or compared with previous versions of the documents. The extractor may, in some embodiments, parse the template and force the user to submit a template that specifies start and end delimiters or otherwise includes features described herein.

Each of the received documents is opened and parsed from beginning to end to obtain an ordered set of each label and value throughout the document (Step 310). For example, the code presented below, if present in a PDF, would indicate that the label "$1,000.00" (line 9) should be rendered in a text box with a length of 44 (line 3) at the coordinates (70, 50) (line 7), in 12-point font in the first typeface referenced in the document (line 8):

```
1 5 0 obj
2 «
3 /Length 44
4 »
5 stream
6 BT
7 70 50 TD
8 /F1 12 Tf
9 ($1,000.00) Tj
10 ET
11 endstream
12 endobj
```

In many PDFs, the "stream" object above, from lines 5 to 11, will be encoded to minimize filesize, and need to be decoded to obtain the value on line 9.

Associations between text labels and their values may be made based on ordering (a value immediately following its label in the file) and/or based on positioning (even if the elements are misordered with the file, a label and a value with a same x- or y-coordinate may indicate that they should be associated. The section definitions in the template may also be of use in determining how to associate the various textboxes that appear in each section.

Using all the information from the template and labels available thus far, each of the two documents' sets of labels and values are paired up (Step 315).

The paired values are compared to ensure equality of the data (Step 320). A one-to-many comparison is performed between each label/value and the other labels/values in the same section of the corresponding document, to ensure that if a match exists, it is found whether the ordering has been preserved in the other document. In addition to obvious mismatches, such as completely different strings or numbers, the comparison should note issues such a positive or negative sign (which may be erroneously omitted when a transaction list has both credits and debits); currency signs or other punctuation; accents, diacritics, or other characters that may not print in all contexts; and dates that are formatted in a different way.

Figure 4:
FIG. 4 depicts a sample generated spreadsheet based on the comparison.

Once all the comparisons have been performed, a detailed data comparison report is generated (Step 325), as depicted in FIG. 4. In a preferred embodiment, this report is an OOXML spreadsheet (.XLS or .XLSX) that compares data values side by side and highlights any inconsistencies between the data, whether a direct conflict, a minor inconsistency in presentation as described above, or an inconsistency that may be caught by the spreadsheet's typed data cells (for example, a number being presented as a currency in one document and as a plain decimal in another).

If there is a mismatch (Step 330), the system may directly alert a human user (Step 335), such as by generating an email, generating a ticket in an issue tracker, or generating a notification viewable within a user interface that the human user is using.

Whether a human user is contacted or not, the extractor system may also generate more detailed meta-reports (Step 340), displaying the results of multiple file comparisons with an interactive, web-based drilldown menu as depicted in FIG. 6. The report may include all sets of PDFs that have been compared, whether each set matched or had an inconsistency, and if the set is clicked, tapped, or otherwise interacted with, displays all the paired data that would have been in the spreadsheet within the user's web browser.

Finally, the system returns to a state of readiness to receive more commands to extract and compare documents, or if it is doing a batch comparison of many files or sets of files, the system proceeds with the next task from the batch.

FIG. 4 depicts a sample generated spreadsheet based on the comparison described during the method depicted in FIG. 3.

In one embodiment, if two PDFs are being compared, the spreadsheet 400 may allocate sufficient columns to store all the data values arranged as in the PDF, with the columns side by side. Thus, as depicted, Columns A-D represent data fields in a first PDF, while Columns E-H represent data fields in a second PDF. Although all four columns are needed to display the transactions in rows 3-9, the singular data fields for Name and Address require only two columns for each PDF, leaving the other two columns blank.

In some embodiments, instead of arranging the data so that every section is stacked vertically in a same display, different sections may be arranged in different worksheets within a spreadsheet, such that, for example, the transactions would continue to take up eight columns in a second worksheet, but in the first worksheet, only four columns would be needed to portray the names and addresses side by side, without superfluous whitespace. In other embodiments, a separate spreadsheet may be generated for each PDF, instead of displaying the data side by side within a single spreadsheet.

The extracted data is converted to an appropriate datatype when populated into cells of the spreadsheet. For example, columns D and H contain cells whose datatype is currency, due to the dollar signs associated with prices in the PDF; columns A and E contain cells whose datatype is a date, if the PDF stores fields that are parseable as a date or are associated with a label that indicates they are dates; and columns C and G contain cells whose datatype is integer, since they are parseable as numbers and contain no indication that they should be of another type. All labels, as well as all values that are not parseable as a more specific datatype, as stored as strings in the spreadsheet.

Various visual indicators may be introduced into the spreadsheet to highlight potential data corruption or inconsistencies. For example, a complete data mismatch, like that between the different values in cells C6 and G6, may be indicated by highlighting the cell in a particular color such as red, changing the color of the font or other aspects of the typeface in those cells, creating a border or other spreadsheet-specific visual indicator, or any other way of drawing a user's attention to the cells in question. Similarly, an inconsistency, such as "1.05" being displayed as a currency in one document but a non-currency decimal in another, may be indicated in cells D7 and H7 by means of highlighting, font color, font presentation, or other visual methods.

A human user will thus be able to quickly scan through a spreadsheet summary report to see clearly marked indicators of where data errors may lie, instead of having to scan through PDF documents and manually compare values.

FIG. 5 depicts a sample user interface for batch comparison of documents.

A web-based user interface 500 may allow the selection of previously generated files via file selector elements 505. After the two documents have been selected, attribute lists 510 are populated with the attributes that are present in each document. A human user may consult these lists to verify that expected attributes are present, to refrain from comparing the files if it appears there is a mistake regarding their attributes, and, in some potential embodiments, to interact with the lists, associating two attributes having different names and thereby automatically updating the template used during parsing to indicate that these attributes should be compared and validated. For example, the data template should be updated to include that what is shown as "Account Balance" in the MonthlyStatement_A file corresponds to the "Ending Balance" in the MonthlyStatement_B file.

A button or other user interface element 515 triggers the process of comparison, after which a success or error message may be displayed, or after which the user interface of FIG. 6 may be displayed.

FIG. 6 depicts an interactive report generated after a batch comparison of documents.

An interactive user interface 600 may include one or more charts 605 showing whether comparisons between files have been successful and whether they have identified any issues requiring human intervention. A table of document comparison summaries 610 shows, for each comparison of a newer file with an older one, whether the regression testing was passed. A search function 615 may be used to avoid forcing the user to scroll through thousands of comparisons, when comparisons are being done in bulk.

When the user clicks, taps, or otherwise interacts with a particular comparison summary, a new table of data value comparisons 620 is populated and becomes visible. The table of data value comparisons 620 may allow the user to review data matches and inconsistencies just as they are depicted in the static report depicted in FIG. 4.

Figure 7:
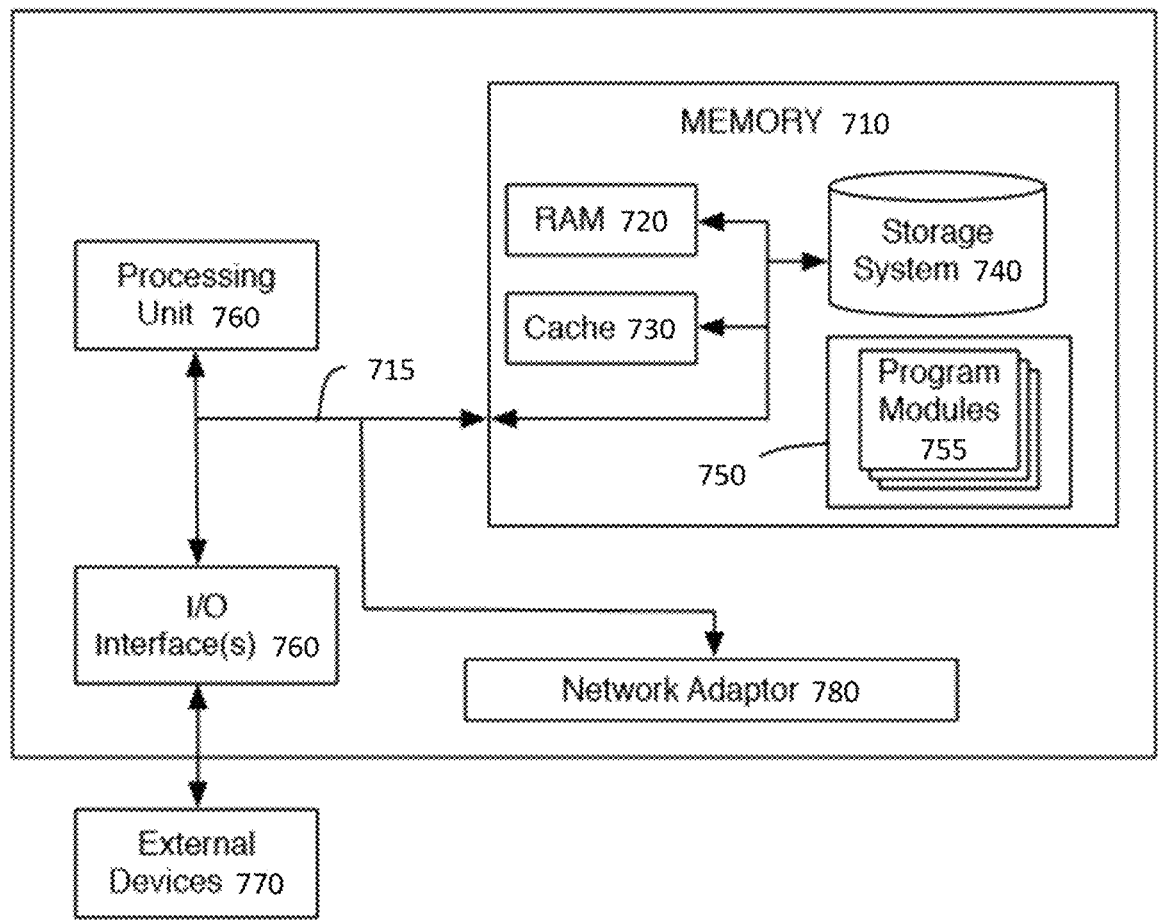
FIG. 7 is a high-level block diagram of a representative computing device that may be utilized to implement various features and processes described herein.

Although FIG. 1 depicts a preferred configuration of computing devices to accomplish the software-implemented methods described above, those methods do not inherently rely on the use of any particular specialized computing devices, as opposed to standard desktop computers and/or web servers. For the purpose of illustrating possible such computing devices, FIG. 7 is a high-level block diagram of a representative computing device that may be utilized for each of the computing devices and/or systems to implement various features and processes described herein. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 7, the components of the computing device may include (but are not limited to) one or more processors or processing units 700, a system memory 710, and a bus 715 that couples various system components including memory 710 to processor 700.

Bus 715 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 700 may execute computer programs stored in memory 710. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 700 may be used.

The computing device typically includes a variety of computer system readable media. Such media may be any available media that is accessible by the computing device, and it includes both volatile and non-volatile media, removable and non-removable media.

System memory 710 can include computer system readable media in the form of volatile memory, such as random access memory (RAM) 720 and/or cache memory 730. The computing device may further include other removable/non-removable, volatile/non-volatile computer system storage media. By way of example only, storage system 740 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 715 by one or more data media interfaces. As will be further depicted and described below, memory 710 may include at least one program product having a set (e.g., at least one) of program modules that are configured to carry out the functions of embodiments described in this disclosure.

Program/utility 750, having a set (at least one) of program modules 755, may be stored in memory 710 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 770 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 760.

In addition, as described above, the computing device can communicate with one or more networks, such as a local area network (LAN), a general wide area network (WAN) and/or a public network (e.g., the Internet) via network adaptor 780. As depicted, network adaptor 780 communicates with other components of the computing device via bus 715. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon fix; causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge sewers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system for confirming file integrity of automatically generated documents, comprising:
   one or more databases for document storage;
   one or more processors; and
   non-transitory memory storing instructions that, when executed by the one or more processors, cause the one or more processors to:
      receive a document template specifying one or more sections, each section comprising a set of labels for attributes;
      receive, from the one or more databases, two or more automatically generated documents in the Portable Document Format (.PDF), each document of the two or more automatically generated documents known to have been intentionally generated to include each section, to include each label from the set of labels, and to include a predetermined value for each attribute labeled, but with the labels and predetermined values for the attributes labeled being enumerated in a different order from each other document's order for labels and predetermined values;
      extract the set of labels for attributes and values of each of those attributes from each of the two or more automatically generated documents;
      generate a tabular report comparing the values of each attribute in the two or more automatically generated documents to visually indicate which labels, if any, have differing values despite the intentional generation of the two or more documents to have a same predetermined value for the attribute being labeled; and
      generate an alert for a human user if the value for any attribute in a first document of the two or more automatically generated documents is different from the value for that attribute in a second document of the two or more automatically generated documents, indicating that the intentional generation to include each a predetermined value for each attribute labeled resulted in an error because at least one predetermined value is not present for its attribute.

2. The system of claim 1, wherein the tabular report is a spreadsheet that stores the values as typed data to facilitate side-by-side comparison of the values in columns of the spreadsheet.

3. The system of claim 2, wherein the typing of the data is used to identify a data mismatch between a currency datatype and a non-currency datatype, or between a positive number and a negative number.

4. The system of claim 2, wherein the tabular report is in the office open extensible markup language spreadsheet format (.XLS) and wherein the attributes within each section are displayed in a worksheet designate for that section.

5. The system of claim 1, wherein a web-based interface is generated to present a report based on the results of one or more comparisons, each comparison being of two or more of the automatically generated documents.

6. The system of claim 5, wherein the report is interactive and allows a user to drill down by selecting a comparison and, responsive to the selection, displaying a table of labels and values of attributes from the documents that were compared in that comparison.

7. The system of claim 6, wherein any mismatches of labels or values cause the comparison having mismatched labels or values to be highlighted in the report, and the mismatched labels or values are highlighted if the user selects the comparison and displays the table.

8. The system of claim 1, wherein the two or more automatically generated documents are automatically selected for comparison based on a file naming convention that indicates the two or more automatically generated documents were intentionally generated to include each section, to include each label from the set of labels, and to include a predetermined value for each attribute labeled, but with the labels and predetermined values for the attributes labeled being enumerated in a different order from each other document's order for the labels and predetermined values, based on a shared prefix and differing suffix among the two or more automatically generated documents.

9. The system of claim 1, wherein the labels and predetermined values for the attributes labeled being enumerated in a different order from each other document's order for labels and predetermined values further comprises a label or predetermined value being placed on a different page in one document of the two or more automatically generated documents, compared to another document of the two or more automatically generated documents.

10. A computer-implemented method for confirming file integrity of automatically generated documents, comprising:

receiving a document template specifying one or more sections, each section comprising a set of labels for attributes;

receiving, from the one or more databases, two or more automatically generated documents in the Portable Document Format (.PDF), each document of the two or more automatically generated documents known to have been intentionally generated to include each section, to include each label from the set of labels, and to include a predetermined value for each attribute labeled, but with the labels and predetermined values for the attributes labeled being enumerated in a different order from each other document's order for labels and predetermined values;

extracting the set of labels for attributes and values of each of those attributes from each of the two or more automatically generated documents;

generating a tabular report comparing the values of each attribute in the two or more automatically generated documents to visually indicate which labels, if any, have differing values despite the intentional generation of the two or more documents to have a same predetermined value for the attribute being labeled; and generating an alert for a human user if the value for any attribute in a first document of the two or more automatically generated documents is different from the value for that attribute in a second document of the two or more automatically generated documents, indicating that the intentional generation to include each a predetermined value for each attribute labeled resulted in an error because at least one predetermined value is not present for its attribute.

11. The method of claim 10, wherein the tabular report is a spreadsheet that stores the values as typed data to facilitate side-by-side comparison of the values in columns of the spreadsheet.

12. The method of claim 10, wherein the typing of the data is used to identify a data mismatch between a currency datatype and a non-currency datatype, or between a positive number and a negative number.

13. The method of claim 10, wherein the tabular report is in the office open extensible markup language spreadsheet format (.XLS) and wherein the attributes within each section are displayed in a worksheet designate for that section.

14. The method of claim 10, further comprising generating a web-based interface to present a report based on the results of one or more comparisons, each comparison being of two or more of the automatically generated documents.

15. The method of claim 10, wherein the report is interactive and allows a user to drill down by selecting a comparison and, responsive to the selection, displaying a table of labels and values of attributes from the documents that were compared in that comparison.

16. The method of claim 10, wherein any mismatches of labels or values cause the comparison having mismatched labels or values to be highlighted in the report, and the mismatched labels or values are highlighted if the user selects the comparison and displays the table.

17. The method of claim 10, further comprising automatically selecting the two or more automatically generated documents for comparison based on a file naming convention that indicates the two or more automatically generated documents were intentionally generated to include each section, to include each label from the set of labels, and to include a predetermined value for each attribute labeled, but with the labels and predetermined values for the attributes labeled being enumerated in a different order from each other document's order for the labels and predetermined values, based on a shared prefix and differing suffix among the two or more automatically generated documents.

18. The method of claim 10, wherein the labels and predetermined values for the attributes labeled being enumerated in a different order from each other document's order for labels and predetermined values further comprises a label or predetermined value being placed on a different page in one document of the two or more automatically generated documents, compared to another document of the two or more automatically generated documents.

* * * * *